(12) United States Patent
Hunzinger

(10) Patent No.: US 7,187,930 B2
(45) Date of Patent: *Mar. 6, 2007

(54) RETRY LIMITS FOR CONNECTION RESCUE PROCEDURES IN TELECOMMUNICATION SYSTEMS

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 720 days.

This patent is subject to a terminal disclaimer.

(21) Appl. No.: 09/992,586

(22) Filed: Nov. 16, 2001

(65) Prior Publication Data

US 2002/0065071 A1    May 30, 2002

Related U.S. Application Data

(60) Provisional application No. 60/253,612, filed on Nov. 28, 2000.

(51) Int. Cl.
*H04Q 7/20* (2006.01)

(52) U.S. Cl. .............. 455/437; 455/436; 455/438; 455/453; 455/442

(58) Field of Classification Search ........ 455/436, 455/450, 437, 439, 423, 432.1, 438, 453, 455/442
See application file for complete search history.

(56) References Cited

U.S. PATENT DOCUMENTS

| | | | |
|---|---|---|---|
| 5,081,671 A | 1/1992 | Raith et al. | |
| 5,267,261 A | 11/1993 | Blakeney, II et al. | |
| 5,301,356 A | 4/1994 | Bodin et al. | |
| 5,530,912 A | 6/1996 | Agrawal et al. | |
| 5,640,414 A | 6/1997 | Blakeney, II et al. | |
| 5,673,259 A | 9/1997 | Quick, Jr. et al. | |
| 5,722,044 A | 2/1998 | Padovani et al. | |
| 5,729,826 A | 3/1998 | Gavrilovich | |
| 5,884,174 A | 3/1999 | Nagarajan et al. | |
| 5,913,167 A | 6/1999 | Bonta et al. | |
| 5,937,019 A | 8/1999 | Padovani | |
| 6,052,594 A | 4/2000 | Chuang et al. | |
| 6,061,337 A | 5/2000 | Light et al. | |
| 6,104,927 A | 8/2000 | Willey | |
| 6,161,014 A | 12/2000 | Girardeau et al. | |
| 6,233,454 B1 | 5/2001 | Sato | |
| 6,236,365 B1 | 5/2001 | LeBlanc et al. | |
| 6,253,083 B1 | 6/2001 | Hacena et al. | |
| 6,337,983 B1 * | 1/2002 | Bonta et al. ............ 455/437 |

(Continued)

*Primary Examiner*—Charles Appiah
*Assistant Examiner*—Randy Peaches
(74) *Attorney, Agent, or Firm*—Morrison & Foerster LLP

(57) ABSTRACT

An efficient and safe procedure to limit the number and concentration of attempts to rescue communication connections from dropping is disclosed. One embodiment limits the number of rescues per connection. Another embodiment allows a rescue only if a certain amount of time has passed since the last rescue. Yet another embodiment limits the total number of rescues per predetermined amount of time. In addition, combinations of these rescue limitations may be employed. In other embodiments, a mobile station (MS) keeps track of the percentage of good frames that were received over some period of time and checks it against a threshold to determine if it is too low to maintain a conversation. Alternatively, if a certain number of number of failed retransmissions of a message requiring acknowledgments are detected, or a certain number of bad frames are detected, or generally a poor connection is detected based on any other indicator, subsequent failures may not be rescued.

4 Claims, 11 Drawing Sheets

U.S. PATENT DOCUMENTS

| | | |
|---|---|---|
| 6,343,216 B1 | 1/2002 | Kim et al. |
| 6,345,185 B1 | 2/2002 | Yoon et al. |
| 6,360,100 B1 | 3/2002 | Grob et al. |
| 6,445,918 B1 | 9/2002 | Hellander |
| 6,477,373 B1 * | 11/2002 | Rappaport et al. .......... 455/436 |
| 6,512,927 B2 | 1/2003 | Hunzinger |
| 6,519,457 B1 | 2/2003 | Jiang et al. |
| 6,542,744 B1 | 4/2003 | Lin |
| 6,567,666 B2 | 5/2003 | Czaja et al. |
| 6,580,919 B1 | 6/2003 | Saito |
| 6,606,343 B2 | 8/2003 | Zeira et al. |
| 6,671,265 B1 | 12/2003 | Hwang et al. |
| 6,674,736 B1 | 1/2004 | Tiedemann, Jr. |
| 2001/0055969 A1 | 12/2001 | Bonta et al. |
| 2002/0034947 A1 | 3/2002 | Soliman |
| 2002/0037726 A1 | 3/2002 | Czaja et al. |
| 2002/0058528 A1 * | 5/2002 | Hunzinger .................. 455/550 |
| 2002/0142776 A1 | 10/2002 | Tiedemann, Jr. |
| 2003/0002525 A1 | 1/2003 | Grilli |
| 2003/0022630 A1 | 1/2003 | Gandhi et al. |
| 2004/0233883 A1 | 11/2004 | Ludwig et al. |

* cited by examiner

Forward Link
Pilot Channel(s)
Sync Channel
Paging Channel(s)
Traffic Channels

Reverse Link
Access Channel
Traffic Channel(s)

| CR_RETRY_DELAY | Time |
|---|---|
| 00000 | No Delay |
| 00001 | 1 Second |
| 00010 | 2 Seconds |
| 00011 | 5 Seconds |
| 00100 | 10 Seconds |
| 00101 | 30 Seconds |
| 00110 | 1 Minute |
| Etc. | Etc. |

RETRY LIMITS FOR CONNECTION RESCUE PROCEDURES IN TELECOMMUNICATION SYSTEMS

CROSS-REFERENCE TO RELATED APPLICATIONS

Embodiments of the present invention claim priority from U.S. provisional patent application Ser. No. 60/253,612 entitled "Retry Limit for Drop Call Rescue Channel Procedures," filed Nov. 28, 2000, and are related to U.S. utility application Ser. No. 09/978,974 entitled "Forward Link Based Rescue Channel Method and Apparatus for Telecommunication Systems," filed Oct. 16, 2001, the contents of which are incorporated herein by reference for all purposes.

BACKGROUND OF THE INVENTION

1. Field of the Invention

The present invention relates, generally, to communication network management and, in one embodiment, to methods and apparatus for providing an efficient and safe procedure to limit the number and concentration of attempts to rescue communication connections from dropping.

2. Description of Related Art

Introduction

Rather than just providing a means for emergency communications, cellular telephones are rapidly becoming a primary form of communication in today's society. As cellular telephone usage becomes widespread, cellular telephone networks are becoming increasingly prevalent and are providing coverage over larger areas to meet consumer demand. FIG. 1 depicts an example of a mobile station (MS) 10 operated by a mobile user that roves through a geographic area served by a wireless infrastructure or network including a first base station (BS) 12 with wireless sectors A 14 and sector B 16, and a second BS 18, with a sector C 20. In the course of such roving, MS 10 travels from position A to position B to position C and will, as a matter of course, experience variations in signal strength and signal quality of the forward link associated with the BS(s) that it is in contact with. Signal strength and quality can be especially undependable near the edges of the sectors, such as when the MS 10 transitions from the area defined by the dotted line of Sector A 14 to the area defined by the dotted line of Sector B 16, or from Sector B 16 to Sector C 20. It is in these transition areas, as well as other areas of weak signal strength or quality, where dropped connections are likely to occur. A connection as referred to herein includes, but is not limited to, voice, multimedia video or audio streaming, packet switched data and circuit switched data connections, short message sequences or data bursts, and paging.

Dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

Cellular Telephone Networks

FIG. 2 illustrates an exemplary communication link 22 between a MS 24 and a BS 26. Communications from the BS 26 to the MS 24 are called the forward link, and communications from the MS 24 to the BS 26 are called the reverse link. A BS 26 is typically comprised of multiple sectors, usually three. Each sector includes a separate transmitter and antenna (transceiver) pointed in a different direction. Because the term BS is often used to generally identify a transceiver, it should be understood that the terms BS and sector are used herein somewhat interchangeably. The forward and reverse links utilize a number of forward and reverse channels. For example, the BS 26 broadcasts on a plurality of forward channels. These forward channels may include, but are not limited to, one or more pilot channels, a sync channel, one or more paging channels, and multiple forward traffic channels. The pilot, sync, and paging channels are referred to as common channels because the BS 26 communicates those channels to all MSs. Generally, these common channels are not used to carry data, but are used to broadcast and deliver common information. In contrast, the multiple forward traffic channels are referred to as dedicated channels, because each forward traffic channel is intended for a specific MS 24 and may carry data.

Each sector within BS 26 broadcasts a pilot channel that identifies that sector and is simple for a MS 24 to decode. Both sectors and pilot channels are distinguished by pseudo-noise (PN) offsets. The word "pilot" can be used almost interchangeably with the term sector, because a pilot channel identifies a sector.

The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS.

When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message.

In general, each BS may utilize one pilot channel, one sync channel and one paging channel that are common for all MSs to receive. However, because there are practical limitations the number of MSs that can be simultaneously paged using one paging channel, some BSs may employ multiple paging channels.

The reverse channels may include an access channel and one or more reverse traffic channels. After a MS receives an incoming page from a BS, the MS will initiate a connection setup using, in part, an access channel.

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window. In code division multiple access (CDMA), given a space of frequency and time, each channel is assigned various frequencies at various times, according to a particular Walsh code or quasi-orthogonal function (QOF). The code will define how a particular channel changes over frequency and time. In direct sequence CDMA, the data from each channel is coded using Walsh codes or QOFs and then combined into a composite signal. This composite signal is spread over a wide frequency range at a particular time. When this composite signal is decoded using the same code used to code the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary. However, noise and interference in the field may require error correction to determine what was actually transmitted. The CDMA wireless communication system is fully described by the following standards, all or which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95B, published Feb. 1, 1999; and TIA/EIA/IS-2000, Volumes 1–5, Release A, published Mar. 1, 2000.

With further reference to CDMA for purposes of illustration only, the Walsh codes or QOFs are used to code a particular channel. Thus, as described above, the simple to decode pilot channel may be the all one coded $W_0$ Walsh code. Similarly, the sync channel may use the alternating polarity $W_{32}$ Walsh code and again, these codes are fixed and known.

Each MS groups the channels into various sets, which may include, but is not limited to, an active set, a neighbor set, a candidate set, and a remaining set.

The MS active set contains the pilots or PN offset identifiers that a MS is utilizing at any point in time. Thus, when a MS is idle, but monitoring a single BS for pages and overhead updates, the active set for that MS will contain that BS pilot or PN offset identifier as its only member.

There may be instances, however, when a MS is being handed off from one BS or sector to another, and during this handoff may actually be in communication with multiple BSs or sectors at the same time. When this occurs, multiple active pilots will be in the active set at the same time. For example, in a "soft handoff," a MS in communication with BS "A" will begin to communicate with a BS "B" without first dropping BS "A," and as a result both BS "A" and "B" will be in the active set. In a "softer handoff," a MS in communication with sector "A" in BS "A" will begin to communicate with a sector "B" in BS "A" without first dropping sector "A," and as a result both sector "A" and "B" will be in the active set. In a "hard hand-off," however, a MS in communication with BS "A" will begin to communicate with a BS "B" only after first dropping BS "A," and as a result either BS "A" or "B" will be in the active set at any one time, but not both.

During the time in which the MS is in communication with multiple BSs, the MS assigns rake receiver fingers to multiple channels from one or more sectors at the same time. When a MS is in communication with multiple BSs at the same time, the MS should be receiving the same data from both of those BSs. However, although the data may be the same, it may be communicated differently from different BSs because the channels may be different. The rake receiver will therefore receive encoded data from different sectors on different channels, demodulate those sectors independently, and then combine the data. When the data is combined, the data from a strong channel may be weighted more heavily than data from a weak channel, which is likely to have more errors. Thus, the data with a higher likelihood of being correct is given higher weight in generating the final result.

When a MS is idle, a neighbor set which includes BSs that are neighbors to the active BS is received by the MS on a common channel. However, when a MS is active and communicating with a BS through a traffic channel, the neighbor set is updated on a traffic channel.

Any other BSs in the network that are not in the active, neighbor, or candidate sets (discussed below) comprise the remaining set. As illustrated in FIG. 3, whether a MS is idle or active, the network repeatedly sends overhead messages 30, 32 and 34 to the MS. These overhead messages contain information about the configuration of the network. For example, the extended neighbor list overhead message 34 tells the MS what neighbors exist and where to look for them. These neighbor identifiers are stored, at least temporarily, within the memory of the MS.

The candidate set is a set of BSs that the MS has requested as part of its active set, but have not yet been promoted to the active set. These candidate BSs have not yet been promoted because the network has not sent a hand-off direction message (HDM) to the MS in reply to the message from the MS, directing that MS change its active set to include these BSs. Typically, the exchange of such messages occurs as part of the handoff process, described below.

FIG. 4 depicts a generic structure of a wireless infrastructure 56. A client MS 36 continually monitors the strength of pilot channels it is receiving from neighboring BSs, such as BS 38, and searches for a pilot that is sufficiently stronger than a "pilot add threshold value." The neighboring pilot channel information, known in the art as a Neighbor Set, may be communicated to the MS through network infrastructure entities including BS controllers (BSC) 40 that may control a cell cluster 42, or a mobile switching center (MSC) 44. It should be understood that the MS and one or more of these network infrastructure entities contain one or more processors for controlling the functionality of the MS and the network. The processors include memory and other peripheral devices well understood by those skilled in the art. As the MS 36 moves from the region covered by one BS 38 to another, the MS 36 promotes certain pilots from the Neighbor Set to the Candidate Set, and notifies the BS 38 or BSs of the promotion of certain pilots from the Neighbor Set to the Candidate Set via a Pilot Strength Measurement Message (PSMM). The PSMM also contains information on the strength of the received pilot signals. The BS 38 determines a BS or network Active Set according to the Pilot Strength Measurement Message, and may notify the MS 36 of the new Active Set via an HDM. It should be noted, however, that the new active set may not always exactly comply with the MS's request, because the network may have BS resource considerations to deal with.

The MS 36 may maintain communication with both the old BS 38 and the new BS so long as the pilots for each BS are stronger than a "pilot drop threshold value." When one of the pilots weakens to less than the pilot drop threshold value, the MS 36 notifies the BSs of the change. The BSs may then determine a new Active Set, and notify the MS 36 of that new Active Set. Upon notification by the BSs, the MS 36 then demotes the weakened pilot to the Neighbor Set. This is one example of a handoff scenario. It is typical for a MS 36 to be starting a handoff or in the process of handoff when connections fail. This is expected because poor coverage or weak signal environments generally exist near cell boundaries, in areas of pilot pollution, or areas significantly affected by cell breathing, all which are well known in the art.

Dropped Connections

A dropped connection may manifest in a number of ways. FIG. 5 shows a situation known in the art as a Layer 2 Acknowledgment Failure for a CDMA wireless network. In the example of FIG. 5, the MS is transmitting a PSMM 48 requiring an acknowledgment by the BS. The BS may be receiving it correctly, but in the case shown in FIG. 5, the MS is not receiving the BS's acknowledgment (ACK) 46. The MS will retransmit the message $N_{1m}$ (=9) times in accordance with a retransmission counter and then terminate (drop) the connection. It is common for this type of failure to occur when the message that the Layer 2 Acknowledgment Failure occurs for is a PSMM 48 which includes a request for a pilot that is needed by the MS to maintain the connection.

FIG. 6 shows a second situation for which recovery is possible using the current invention in a CDMA wireless network. This situation is known in the art as a Forward Link Fade Failure. A fade is a period of attenuation of the received signal power. In this situation, the MS receives $N_{2m}$ (=12) consecutive bad frames 50, the response to which is to disable its transmitter 52. If it is then unable to receive $N_{3m}$ (=2) consecutive good frames before a fade timer expires after $T_{5m}$ (=5) seconds, the MS drops the connection 54. It is common for this type of failure to occur during the time that a MS promotes a pilot to the candidate set and needs to send a PSMM, or after a MS has sent a PSMM but before receiving a handoff direction message.

Layer 2 Acknowledgment Failures and Forward Link Fade Failures may occur because of excessively high frame error rates or bursty error rates. As illustrated in FIG. 7, a channel 58 may be broken up into slots 60, or superframes, typically of 80 millisecond duration. Each slot may be divided into three phases 62. These phases are numbered: 0, 1 and 2. Overlapping on top of the phases are four frames 64. These four frames are aligned with the three phases at the superframe boundaries. Each frame 64 is therefore typically 20 milliseconds long. Within each frame 64 is a header area 66, some signaling information 68 and perhaps some data 70. It should be understood that the content of the frames 64 can differ. One frame may contain signaling and data, another may contain only signaling, and yet another may contain only data. Each frame 64 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate.

In a practical communications network, it is neither realistic nor desirable to target an error rate of zero percent (i.e., all frames received properly). Rather, a frame error rate of one percent, for example, is targeted. Power control loops actually control this frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power and allow the frame error rate to move up to one percent. The BS may therefore continuously instruct the MS, through power control bits in a configuration message, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel. Thus, both the BS and the MS may continuously provide each other feedback in order to change the other's power levels. However, the BS may not necessarily change its transmitter power levels based on the feedback from the MS.

Despite the aforementioned power control loop, error rates may not be controllable to about one percent as a MS moves about in a cellular network and experiences variations in signal strength and signal quality due to physical impediments, interference from adjacent channels, and positions near the edges of sectors, and as the error rates rise to intolerable levels, dropped connections become a problem.

Rescue Procedures

Rescue procedures based on the reverse link or restarting the connection have previously been proposed. In a typical reverse based rescue procedure, the MS transmits a rescue channel while the communications network utilizes one or more sectors in an attempt to demodulate the rescue channel. However, proposed rescue procedures based on restarting the connection utilize the random access channel and require a lot of power because the MS is probing, which also introduces a lot of interference. In addition, proposed reverse-based rescue procedures were activated only during a forward fade condition, and are deficient because the MS transmits before the BS, which is less efficient for reasons which will be explained hereinafter.

To overcome the deficiencies presented by reverse-based rescue procedures, forward based rescue procedures have been proposed. One such forward based rescue procedure is disclosed in U.S. utility application Ser. No. 09/978,974 entitled "Forward Link Based Rescue Channel Method and Apparatus for Telecommunication Systems," filed Oct. 16, 2001, which describes methods and apparatus for preventing loss of signal and dropped connections between a MS and the infrastructure in a telecommunications network. A connection as referred to herein includes, but is not limited to, voice, multimedia video and audio streaming, packet switched data and circuit switched data connections, short message sequences or data bursts, and paging. The procedure, which will be generally referred to herein as the Forward Rescue Procedure (FRP), allows systems to recover from failures at the MS or BS that would otherwise result in dropped connections. Examples of failure scenarios that can be overcome using the FRP include forward link Layer 2 (L2) acknowledgement failures and loss of forward link signal due to a fade that causes loss of signal for a period of time exceeding a threshold value. In response to a potential connection drop situation, a MS will autonomously add BS pilot channels to the active set of its rake receiver in order to rescue the connection in danger of dropping. Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued.

The general FRP includes a MS FRP, and may also include an infrastructure FRP. FIG. 8 illustrates an example of the timeline of the MS FRP and infrastructure FRP in a typical connection rescue. As mentioned above, although the MS FRP is central to any rescue, the infrastructure FRP, although recommended, is not strictly necessary.

Triggering of the MS FRP depends upon the type of failure that occurs. In the case of a Layer 2 failure, the FRP is activated upon a number of failed retransmissions of a message requiring acknowledgments. In the case of a Forward Link Fade Failure, the FRP is activated if there exists a loss of signal for a period of time exceeding a threshold value (see reference character 72).

The MS starts an FRP timer at the time the rescue attempt is started (see reference character 74). If the FRP timer expires before the rescue is complete, then the connection is dropped. In addition, at the time the rescue attempt is started, the MS turns off its transmitter and selects a new active set (see reference character 74). In this embodiment, the MS effectively assumes a handoff direction based on the PSMM (s) that it has sent (whether or not the PSMM was actually sent, successfully sent, or acknowledged). In other words, the MS promotes pilots to the Active set autonomously without a handoff direction (i.e. the new active set is the union of the old active set and the autonomously promoted active pilots: $S''=S \cup S'$) (see reference character 76). The MS then begins to cycle through this new Active set searching for a rescue channel. As noted above, although the term rescue channel encompasses the various schemes for defining channels as utilized by the various communication protocols, for purposes of simplifying the disclosure, a rescue channel will herein be identified as an Assumed Code Channel (ACC) (see reference character 78).

As noted above, the infrastructure FRP, although recommended, is not strictly necessary for every BS in the network. If the infrastructure FRP is implemented (see reference character 80), the infrastructure (network) selects sectors from which it will transmit the ACC.

In one embodiment of the FRP, null (blank) data is transmitted over the ACC during rescue. In other embodiments, data may be communicated over the ACC, although a MS would only hear this data if it actually finds and successfully demodulates that ACC.

At some point in time, the MS will find and demodulate $N_{3M}$ good frames of the ACC (see reference character 82), turn on its transmitter, and begins to transmit back to the BS. Once both the MS and BS receive a predetermined number of good frames, the rescue is completed (see reference character 84) and the BS may re-assign the MS to more permanent channels. Additionally, the network may re-assign the ACCs via overheads, for example. The BSs may also re-assign the MS active set to clean up after the rescue by sending a Rescue Completion Handoff message 86 which can re-use any existing handoff messages such as General or Universal Handoff Direction messages. For additional detail on the forward based rescue procedure, see U.S. utility application Ser. No. 09/978,974 entitled "Forward Link Based Rescue Channel Method and Apparatus for Telecommunication Systems," filed Oct. 16, 2001.

Generally speaking, connection rescue methods such as those described above typically attempt to re-establish the connection by finding an alternative or different active set, i.e. a set of BS sectors to hand-off with, in order to maintain the connection. Regardless of the methodology, it is clear that some connection rescue attempts will fail.

If a connection fails repeatedly, rescue procedures may continue attempting rescues indefinitely for an extended period of time. This may result in undue muting of user audio in voice connections. In a packet data connection, quality of service parameters such as data throughput will be negatively impacted. If a connection fails repeatedly and rescue attempts are repeatedly executed with success, then resources may be tied up for rescue purposes. This may negatively impact quality of service and capacity for the individual MS that is experiencing connection failures as well as for other MSs and network infrastructure elements.

Therefore, what is desired is an efficient and safe procedure to limit the number and concentration of attempts to rescue communication connections from dropping.

SUMMARY OF THE INVENTION

Connection rescue methods are procedures designed to rescue connections from dropping due to communication failures such as Forward Link Fades or Layer 2 Acknowledgement retry timeouts. However, without any control on the number and frequency of rescues, a MS could repeatedly retry rescues if the connection continues to fail. This can create situations in which users are subject to very long periods of muting or poor audio, leading to frustration and an increased chance that the user may switch to another service provider. In addition, capacity and performance of the system as a whole will be impacted by repeated transmissions.

The present invention provides an efficient and safe procedure to limit the number and concentration of attempts to rescue communication connections from dropping. The degree of limitation on rescue attempts may depend on network resources and their availability. For example, if the cost of maintaining a connection includes a negative impact on capacity due to a high-power rescue procedure, then a network operation may prefer that rescuing be limited. Another impact is that the user may experience a large amount of muting. For example, if a connection spends 80% of its time in rescue and 20% of its time in poor conditions where the Frame Error Rate (FER) is very high (say above 30%), then it may not be worthwhile to maintain that connection. Maintaining such a connection may not be worth the resources required to rescue it because the essentially unused bandwidth reserved for rescue could be used for other connections with a better quality of service.

There are a number of methods to enforce retry limits. One method would be to limit the number of rescues per connection. Another method would be to allow a rescue only if a certain amount of time has passed since the last rescue. Yet another method would be to limit the total number of rescues per predetermined amount of time. In addition, combinations of these limitations may be employed.

Additionally, it may be preferable to alert a voice user that the connection is dropping rather than simply have the audio muted for a long time. In one case, the audio could possibly be indefinitely muted, particularly if the user is stationary in a poor coverage area. Alternatively, the MS could alert the user after a certain number of successful rescues in rapid succession (or within some short period of time) whether the rescuing should continue or the connection should be dropped.

In other embodiments, the MS could keep track of the percentage of good frames that were received over some period of time and check it against a threshold to determine if it is too low to maintain a conversation. Additionally, the MS could keep track of the reverse transmissions, i.e. how many frames were actually transmitted during a period of time (% of frames transmitted versus all frames). This frame count should include only frames transmitted, and not necessarily all generated frames. If the percentage becomes too low (or a long burst of inactivity occurs), then the MS can use this as input to the decision of whether or not to keep rescuing the connection. Alternatively, if a certain number of failed retransmissions of a message requiring acknowledgments are detected (but not enough to trigger an L2 Acknowledgement failure), or a certain number of bad frames are detected (but not enough to detect a Forward Link Fade failure), or generally a poor connection is detected based on any other indicator, subsequent failures may not be rescued.

BRIEF DESCRIPTION OF THE DRAWINGS

FIG. 10 is a table illustrating a exemplary limitation parameter lookup function according to an embodiment of the present invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. It should be further understood that although the description provided herein may reference the CDMA communication protocol (code-based protocols) for purposes of explanation only, embodiments of the present invention are applicable to other communication protocols and digital radio technologies generally, and include, but are not limited to, CDMA, TDMA, FDMA, GSM, GPRS, and the like.

Figures 9, 11:
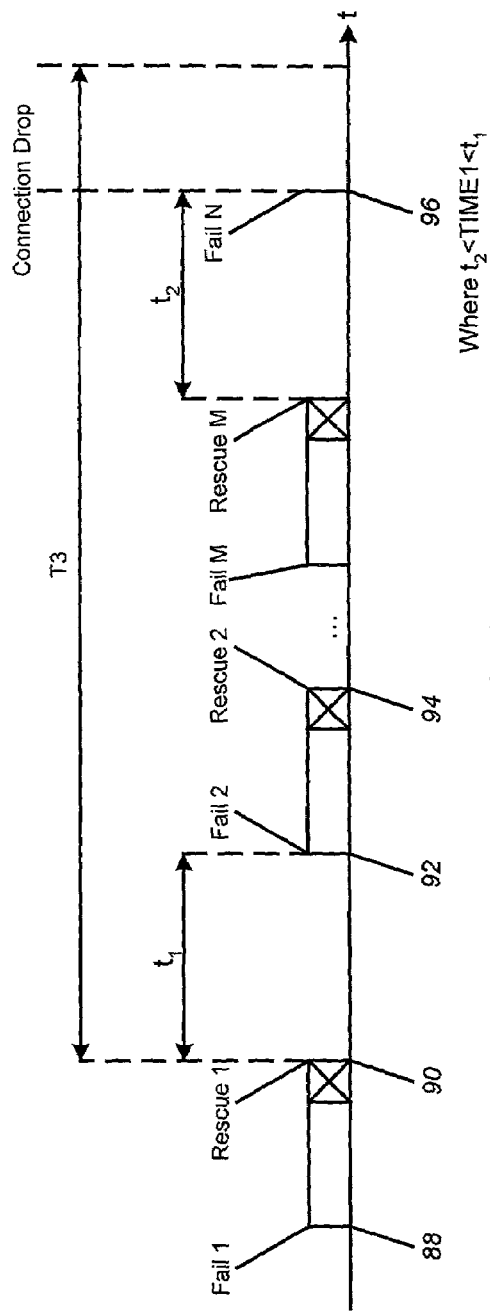
FIG. 9 illustrates an example of the enforcement of retry limits according to an embodiment of the present invention.
FIG. 11 is an order message table illustrating an example of connection rescue control messaging on the forward link according to an embodiment of the present invention.

FIG. 9 illustrates an example of the enforcement of retry limits according to an embodiment of the present invention. In FIG. 9, a MS fails at time 88, is rescued at time 90, fails again at time 92, is rescued again at time 94, and continues this pattern of failing and being rescued. If this MS uses a rescue channel for a relatively long cumulative period of time such as 30% of the time, for example, this may create several problems. First, the high number of failures creates a lot of muting for the user. Second, resources such as codes, power, and the like are being wasted. Third, the numerous rescues may create excessive interference with other channels. To overcome this problem, retry limits may be placed on the connections in need of rescue.

Figure 1:
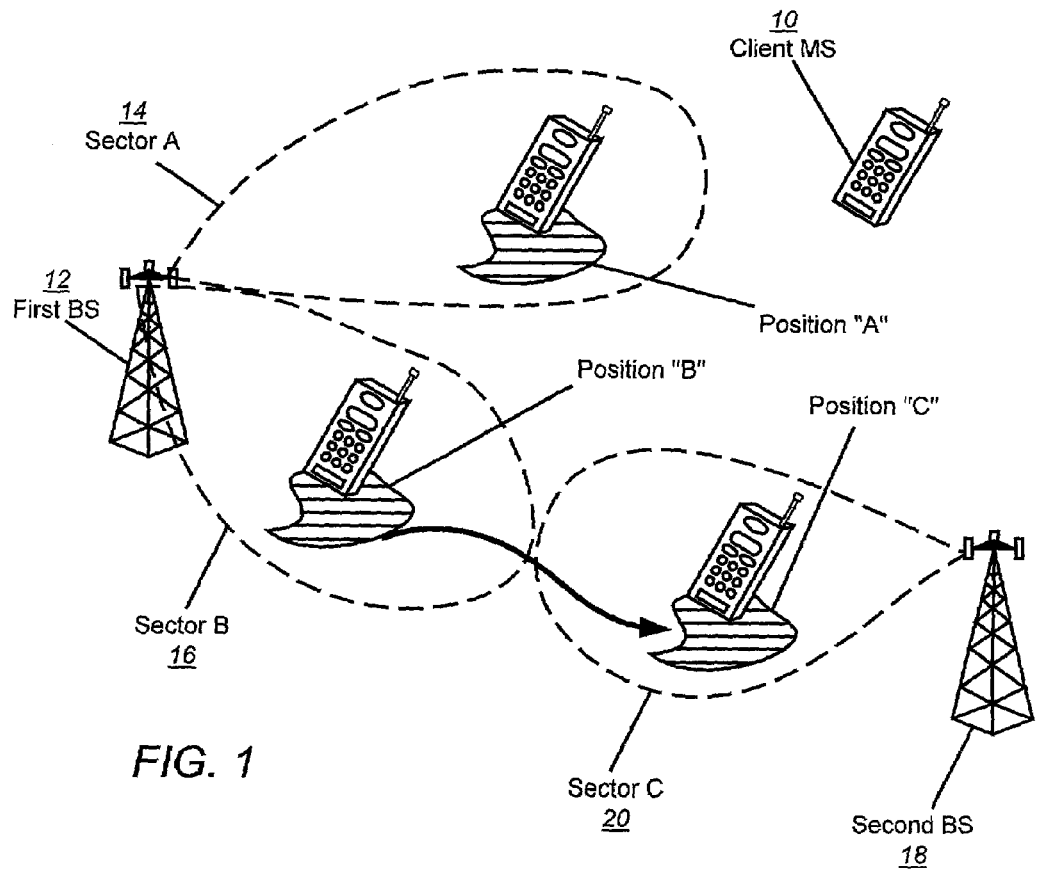
FIG. 1 illustrates a roving mobile station moving amongst different locations between sectors in a wireless communication system.
Figure 2:
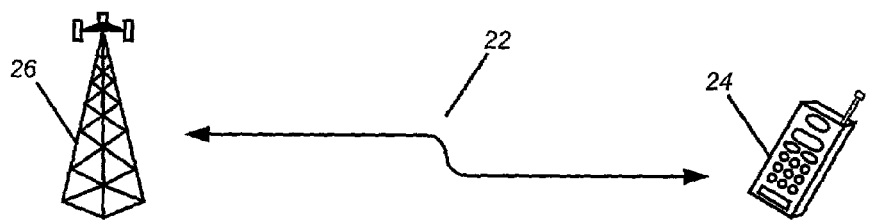
FIG. 2 illustrates an exemplary communication link between a mobile station and a base station in a wireless communication system.
Figure 3:
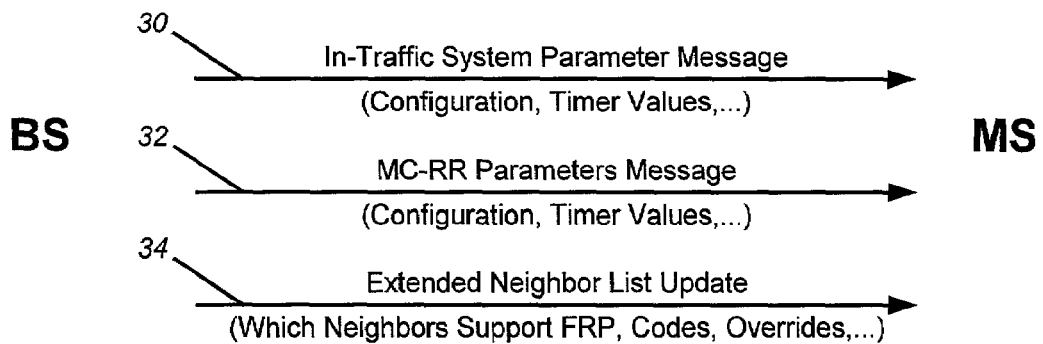
FIG. 3 illustrates overhead messages communicated from a base station to a mobile station in a wireless communication system.
Figure 5:
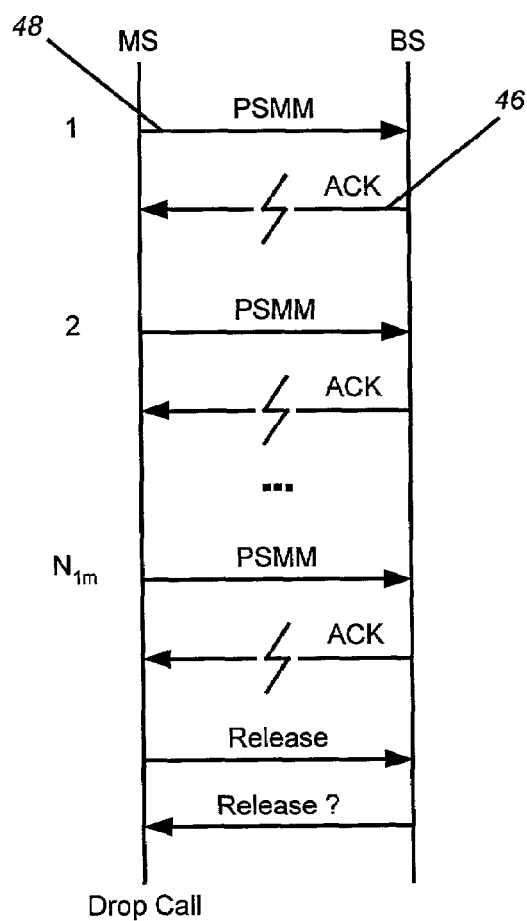
FIG. 5 is a message sequence between a mobile station and a base station resulting in a dropped connection due to Layer 2 Acknowledgement failure.
Figure 4:
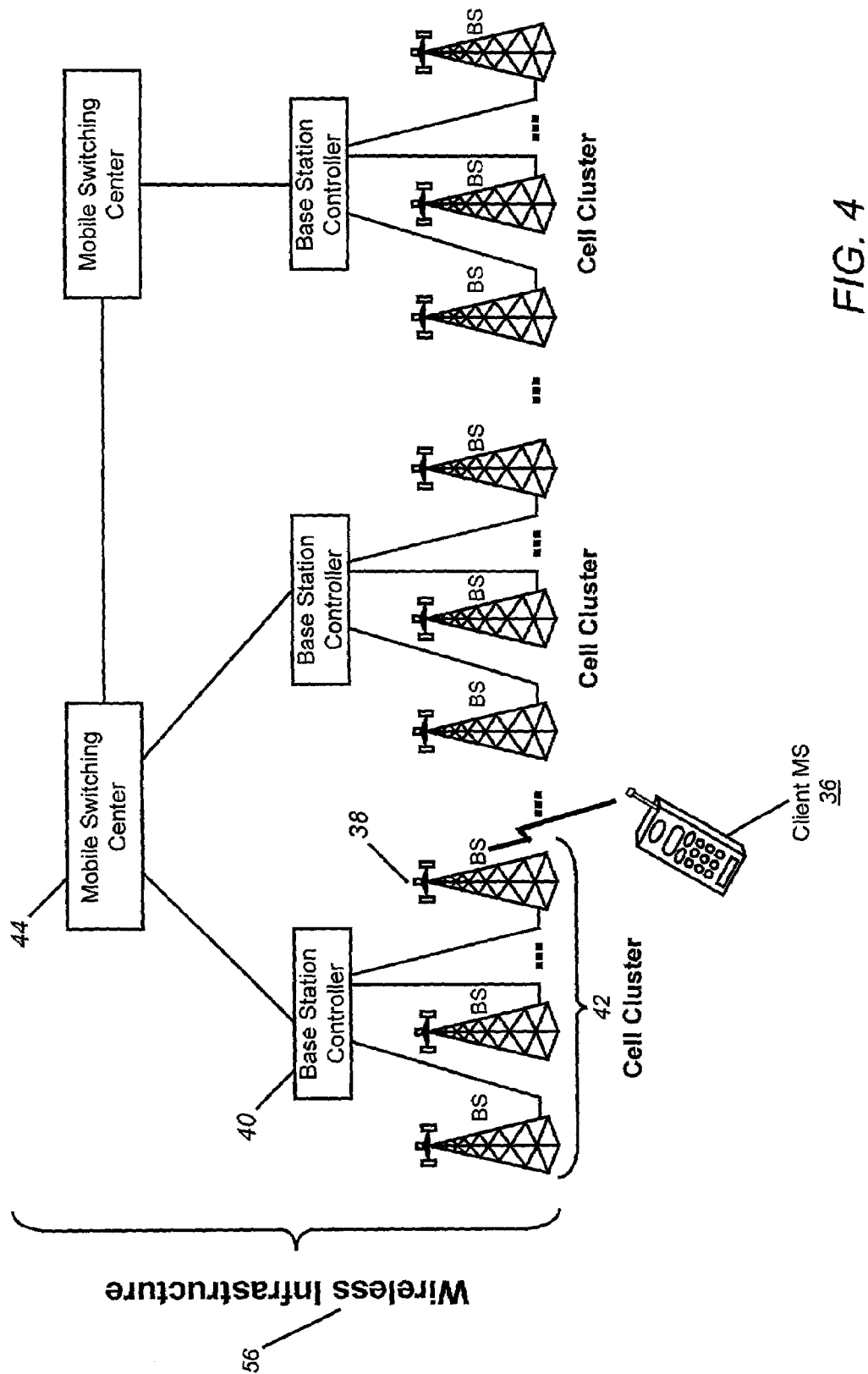
FIG. 4 illustrates a wireless communication infrastructure in communication with a roving mobile station.
Figure 6:
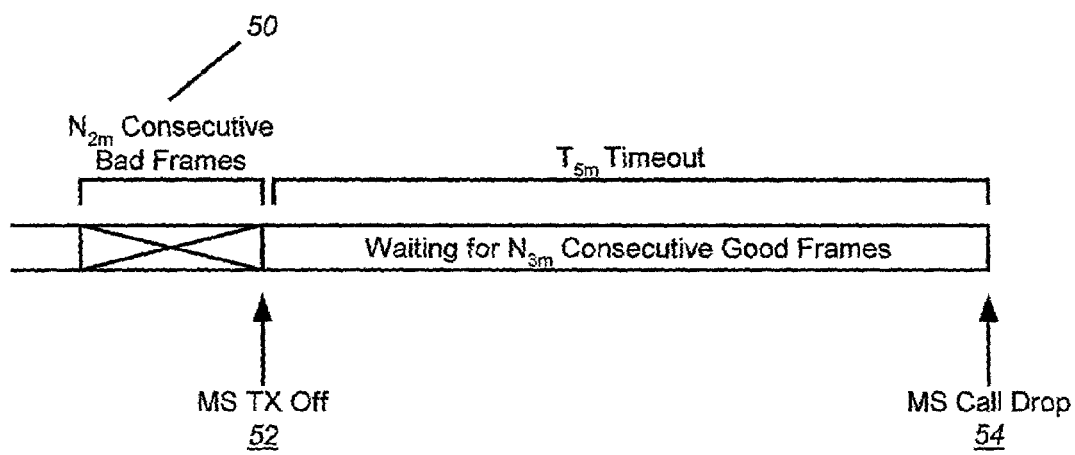
FIG. 6 is a timeline that is representative of a dropped connection resulting from fading of the forward link in a wireless telecommunications network.
Figure 7:
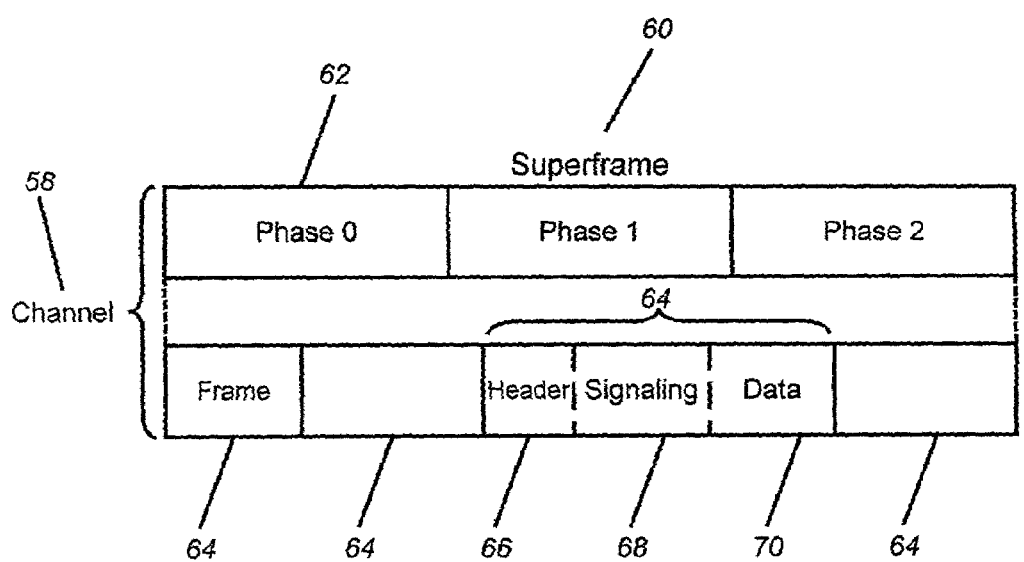
FIG. 7 is a timeline of a superframe, divided into three phases and four frames, for use in a wireless telecommunications network.
Figure 8:
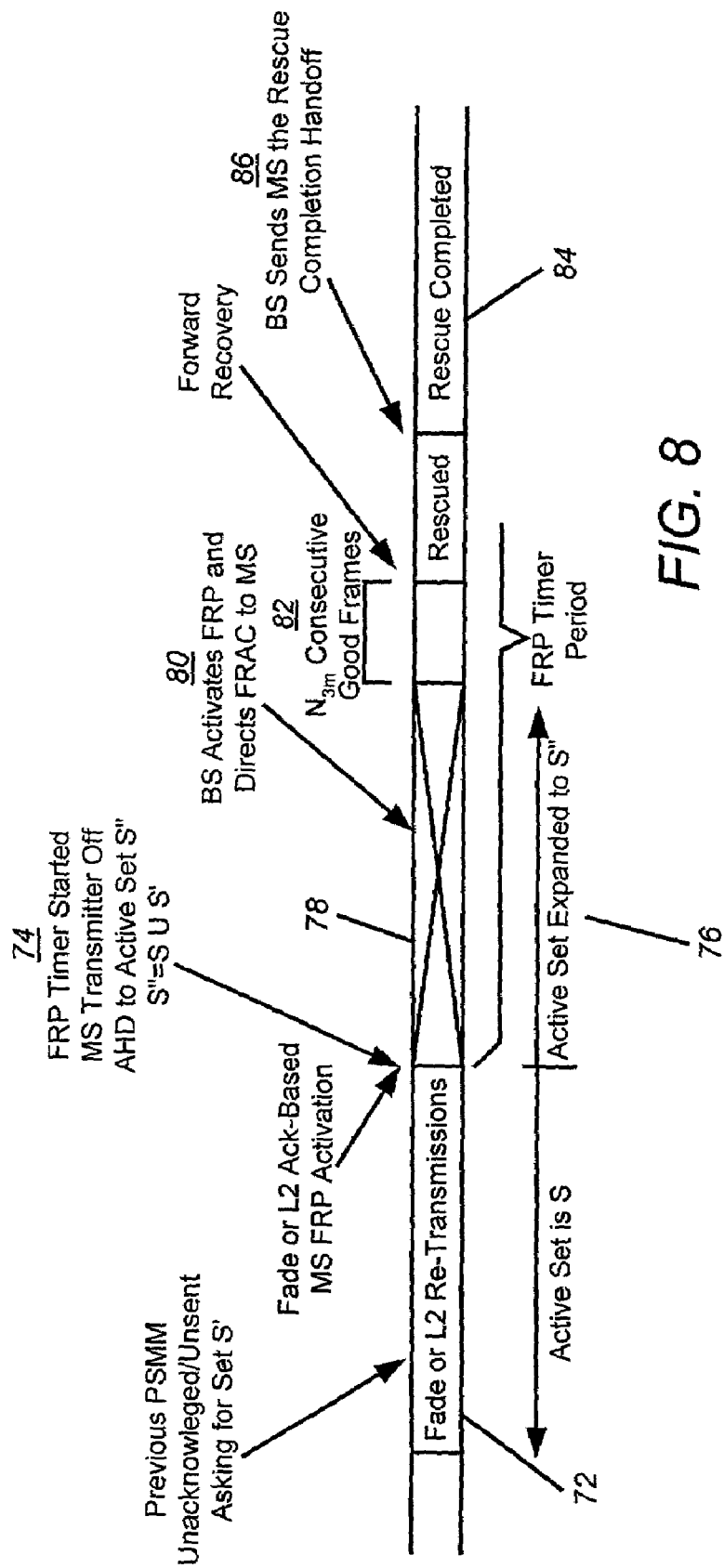
FIG. 8 is a timeline of one embodiment of the Forward Rescue Procedure when it is activated.

Embodiments of the present invention employ a number of methods to enforce retry limits. One method would be to limit the number of rescues per connection. As illustrated in FIG. 9, for any one connection, M rescues of M failures may be permitted, and when that number is exceeded, the Nth failure at time 96 is not allowed, and the connection will be dropped. Another method would be to allow a rescue only if a certain amount of time has passed since the last rescue. In FIG. 9, if the time between the last rescue and the next failure $t_1$ is more than a predetermined amount of time TIME1, then the connection will be rescued. However, if the time between the last rescue and the next failure $t_2$ is less than TIME1, then rescue will not be allowed. Yet another method would be to limit the total number of rescues per predetermined amount of time. In FIG. 9, after a rescue of failure 1 occurs at time 90, a timer may be started to count out a predetermined amount of time T3. During the time period T3, only a fixed number of failures may be rescued, and once that number is reached, any further failures within time period T3 (such as failure N at time 96 in the example of FIG. 3) will result in a dropped connection. In addition, combinations of these limitations may be employed.

Retry limits can be enforced for occurrences that trigger rescue procedures, such as L2 Acknowledgement and Forward Link Fade failures, or occurrences that fall short of failures needing rescue. Both of these occurrences are referred to herein as potentially failing connections. Occurrences that fall short of failures needing rescue generally indicate a poor connection. For example, if the MS detects that a percentage of good frames received over a period of time was less than some predetermined threshold, subsequent failures may not be rescued. Additionally, if the MS detects that the number of frames transmitted over a period of time was less than some predetermined threshold, subsequent failures may not be rescued. Alternatively, if a certain number of number of failed retransmissions of a message requiring acknowledgments are detected (but not enough to trigger an L2 Acknowledgement failure), or a certain number of bad frames are detected (but not enough to detect a Forward Link Fade failure), or generally a poor connection is detected based on any other indicator, subsequent failures may not be rescued.

The rescue decision can be controlled by rescue orders, which are directed messages between a MS and a BS. These rescue orders would be communicated when the connection is not failing, and may occur just after a rescue had occurred, at the start of a connection, at each handoff, or at other significant points in time. Specific rescue orders such as connection rescue "allow" or "disallow" orders sent to the MS may instruct the MS that further rescues are permitted, or that no further rescues are permitted. For specific rescue orders sent to the MS, the BS typically utilizes its processor to make the rescue decision. For example, the BS may maintain a count of rescues per connection, and send "allow" orders until the maximum count has been exceeded, whereupon the BS will then send "disallow" orders for the remainder of the connection.

Rescue control orders may also be transmitted to the MS to communicate rescue parameters needed for the rescue decision, such as the number of further rescues allowed, the time delay before another rescue is allowed, the frequency or concentration of rescues, and the like. FIG. 10 is a table showing one example embodiment of a limitation parameter lookup function. In one embodiment the rescue control order may specify limitations by providing indices 98 into lookup tables. This allows for more efficient communication of the information using fewer bits.

The rescue control orders may also contain specific control information for each type of drop (e.g., L2 or fade). For example, the rescue control order may instruct the MS not to rescue subsequent fade failures, or wait one minute before allowing a subsequent L2 failure, etc. In one embodiment of the present invention, rescue records characterized by different parameters such as the type of failure may be maintained, and that data may be re-applied to the decisionmaking. For example, a network may find that L2 acknowledgment failures are generally more likely to be quickly rescued and do not require further rescuing, and therefore the network may encourage $2^{nd}$, $3^{rd}$, and further rescues of L2 failed connections while refusing re-rescue of faded connections.

Similarly, the rescue control orders may also contain specific control information for each cause of the drop (coverage, handoff speed, pilot pollution, and the like). For example, a MS may fail because it is moving out of the coverage area. In addition, some failures are caused because the handoff was too fast, or too slow. If, for example, a MS is transitioning from sector A to sector B, and sector B is added (begins communication with the MS) and sector A is dropped (ends communication with the MS) before the MS could establish a solid connection with sector B, a failure may occur because the handoff was too fast. If, on the other hand, a MS is transitioning from sector A to sector B, and sector B is added and sector A is dropped, but not until the MS had already lost its connection with the MS, the failure occurred because the handoff was too slow. A connection may fail because of pilot pollution, where a transitioning MS may be confused by the presence of several pilots of similar or marginal signal strength, and fail before a suitable pilot is located. Such causes of failures may be detectable or predictable by the network using locational information, PSMMs (no other pilots are strong enough to rescue the connection), a series of PSMMs, other measurements taken but not transmitted as part of a message, and the like. Depending on the cause of the drop, the parameters of the rescue control orders may vary. It should be understood that rescue parameters specific to the cause of a drop anticipate causes of dropped connections, and are communicated or established in advance of any failing connection. When a failing connection is detected and the cause of the failing connection is determined, rescue parameters specific to the cause of the failing connection may affect the rescue decision.

In further embodiments of the present invention, the rescue control orders may also contain specific control information for each context (type of connection (data, voice, etc.), sector, geographic location, MS, MS vendor, and the like). A benefit of the network being able to closely control the rescue attempts is that it can maximize the efficient use of resources. For example, if a MS enters an area where it is generally inefficient to perform more than one rescue, then the network can limit the rescues on a per sector basis. This is one of the advantages of setting the parameters after handoffs.

Rescue control orders may therefore communicate predetermined information (rescue parameters) needed for the rescue decision, such as the number of further rescues allowed, the time delay before another rescue is allowed, and the like, or connection-specific information related to the type of drop (e.g., L2 or fade), cause of the drop (coverage, handoff speed, pilot pollution, and the like), or context (type of connection (data, voice, etc.), sector, geographic location, MS, MS vendor, and the like). However, it should be understood that this information need not be communicated via rescue control orders. In other embodiments of the present invention, either the MSs or the network may store predetermined rescue parameters, or may determine connection-specific rescue parameters independently in advance of, or at the time of, a failing connection, and use this information in their rescue decisionmaking processes.

Other embodiments of MS or network rescue control according to embodiments of the present invention include rescue restrictions based on the success of previous rescue attempts in the same geographical area or time period or for a particular MS. For example, if the network or MS notices that the MS was rescued in such a way that subsequent rescues will be necessary, no further rescues may be permitted. The rescue limitations could be learned adaptively from recent or current connections in the vicinity. For example, if one MS attempts a rescue but fails, all other MSs with failing connections and experiencing the same conditions may not be allowed to rescue.

Another embodiment of the present invention defines rescue limitations on how fast the last rescue(s) executed. The faster the better, because more time will be spent in the connection and less time in the rescue effort. The slower the rescue, the more resources are wasted and fewer rescues can be performed in a given period of time. Thus, MSs that are able to rescue quickly may be allowed subsequent rescues, while MSs that took a long time to rescue may not be allowed subsequent rescues. Another embodiment defines rescue limitations on how much cumulative (or percentage of) time was spent muted (reverse or forward link, or both).

The above-described rescue control messages may be stand-alone messages, or may be embedded in handoff direction messages, in-traffic system parameters messages, or in a neighbor list update message in order to convey per-sector parameters. In addition, at the end of a rescue when the connection is continued, the rescued MS may be assigned to specific channels using channel assignment messages. Rescue control messages are particularly suited to be contained in these channel assignment messages at the end of a rescue.

FIG. 11 is an exemplary order message table illustrating embodiments of connection rescue control messaging on the forward link. FIG. 11 shows directed messaging embodiments of control of rescue retries. Note that connection rescue control order parameters are specified in ORDQ 100. FIG. 11 shows the implementation of rescue orders in the form used for specifying orders in the IS-2000-A standard but are applicable to overheads, handoff directions, channel assignments and other such messages for over-the-air protocols in general. It is straightforward to extend these ideas to bearers other than cdma2000.

In one embodiment of the present invention, when a MS receives a control order from the network, the MS may utilize its processor to make the rescue decision. For example, if a MS receives a control order containing the time delay before the next rescue is allowed, the MS may then maintain a counter or timer for the requisite time, then enable itself to rescue further failures.

Rescue orders may also be transmitted from the MS to the BS. For example, if the MS receives a control order containing the time delay before the next rescue is allowed, and the MS maintains a counter or timer to count out this time period, the MS may send specific orders to the BS during this time period, instructing the BS not to attempt a rescue of the connection. When the time period elapses, and the MS enable itself to rescue further failures, the MS may then send a specific order to the BS, instructing the BS to attempt to rescue further failures.

In addition, the MSs may maintain their own strategies for establishing retry limits, independent of the BS. For example, in order to limit user frustration with the handset, the MS may implement its own retry limit procedure which is stricter that the network retry limit criteria, wherein if a certain limited number of rescues occur during a single connection, no further rescues will be permitted. The MS, like the network described above, may detect the type, cause, or context of a failure, and change its rescue control orders accordingly. Thus, it should be understood that the retry limit strategies discussed herein, although directed primarily to network retry limit strategies for purposes of simplifying the disclosure, are equally applicable to MS retry limit strategies.

In another embodiment of the present invention, it may be preferable to alert a voice user that the connection is dropping rather than simply have the audio muted for a long time. Indefinite periods of muting of the audio may occur, for example, if the user is stationary in a poor coverage area. Alternatively, the MS could alert the user after a certain number of successful rescues in rapid succession (or within some short period of time) whether the rescuing should continue or the connection should be dropped. For example, after a predetermined number of rescues, the MS may play a voice memo, notifying the user that the connection is failing, and giving the user an option of pressing certain keys or speaking voice commands to either attempt further rescues, or end the connection. The MS may also prompt the user to enter certain user-configurable rescue parameters, such as the number of rescues the user will permit for a given connection. These user-configurable rescue parameters would be subject to, and limited by, overall MS or network retry limit criteria.

Furthermore, the retry limit strategies discussed herein are equally applicable to both reverse and forward based rescue procedures. For forward based rescue procedures where the network would be transmitting a rescue channel, the network's rescue intent may be based on its own rescue decisionmaking and/or the MS's rescue intent, because the MS may independently make its own rescue decisions and pass them along to the network. Once the network's rescue intent is established, the network informs the MS of its rescue intent, so that if a rescue will not be attempted, the MS will simply drop the connection rather than wait and look for the rescue channel. For reverse based rescue procedures where the MS would be transmitting a rescue channel, the MS's rescue intent may be based on its own rescue decisionmaking and/or the network's rescue intent, because the network may independently make its own rescue decisions and pass them along to the MS. Once the MS's rescue intent is established, the MS informs the network of its rescue intent, so that if a rescue will not be attempted, the network will simply drop the connection rather than wait and look for the rescue channel.

Figure 12:
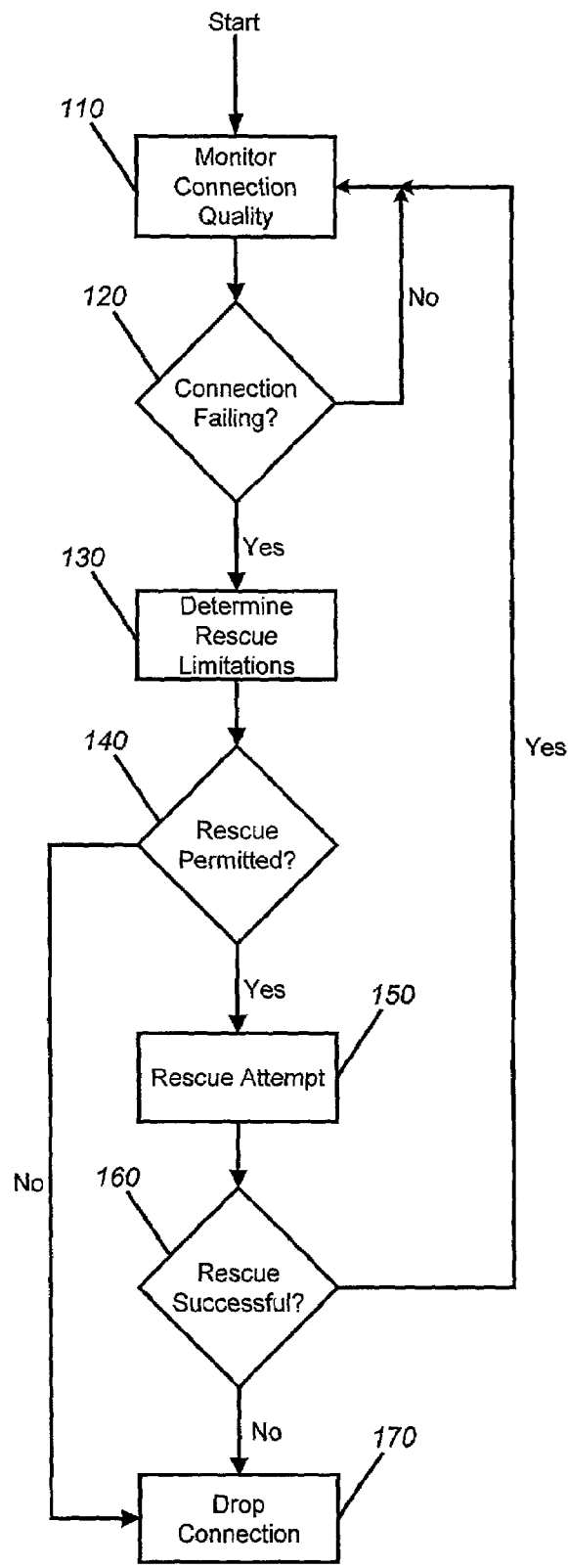
FIG. 12 is a flow chart illustrating the process of controlling rescue attempts according to an embodiment of the present invention.

FIG. 12 is a flowchart summarizing the general process of controlling rescue attempts according to embodiments of the present invention described above. A network entity such as the MS or BS monitors the connection 110 to determine if the connection is failing and if rescue is required or should be attempted. In one embodiment, both a MS and BS(s) may execute the procedures of FIG. 12. The monitoring entity checks if the connection is failing 120, and continues monitoring 110 if it is not. If the connection is failing then the process determines what, if any, active limitations exist on rescue attempts 130. This may involve recalling rescue limitations that were transmitted to the MS by the network, pre-configured parameters or reading a database entry. Block 130 also includes determining information applicable to limitations such as the number of rescue attempts already made for the current connection. The entity then checks in block 140 if, based on the limitations and the current conditions, a rescue is permitted. If no rescue is permitted because such a rescue would exceed the limitations or restrictions set forth for rescues, then the connection is not rescued and may result in a dropped connection 170. If a rescue is permitted, the entity initiates the rescue attempt 150, which, if successful 160, re-establishes the connection. The entity then continues to monitor for any further failures 110. If the rescue fails, then the connection is dropped 170.

FIGS. 13A through 13F are message and event sequence charts showing example embodiments of the invention. Embodiments of the present invention include a signaling mechanism that may be used to influence the MS or BS(s) decision regarding whether or not to rescue a connection, or whether or not to continue to rescue a connection that keeps failing. Embodiments of the present invention include limiting the number of rescues within one connection, limiting the number of rescues within a certain period of time, limiting the time between rescues, (i.e. do not allow another rescue until a certain time has passed), or some combination of these. In the case of limiting the time between rescues, the connection will be dropped if the connection fails soon after a successful rescue. The parameters describing such limitations may be specified in a standard, predefined, or communicated to an entity limiting a rescue procedure through messaging. In one embodiment, the infrastructure (network) could communicate limitation parameters to MSs in overhead messages.

Figure 13A:
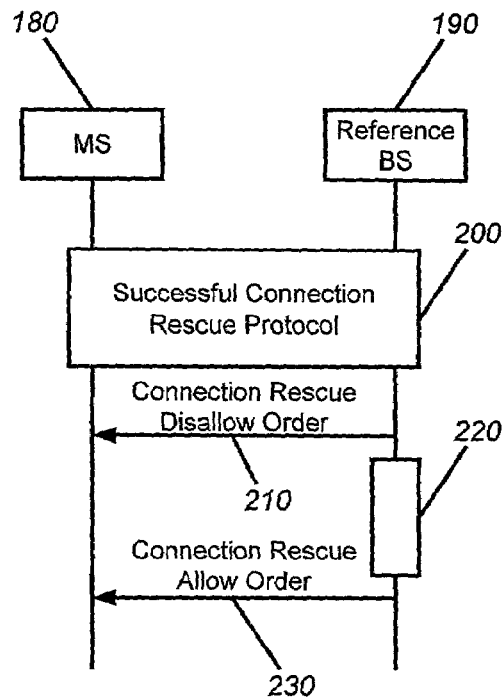
FIGS. 13A through 13F are exemplary message and event sequence charts illustrating embodiments of the invention.

FIG. 13A shows a MS 180 communicating with a reference BS 190. After a successful rescue protocol 200, the reference BS 190 may send a Connection Rescue Disallow Order 210 specifying that the MS 180 is not permitted further rescue. After some time, represented by block 220, has expired, the reference BS 190 may then send a Connection Rescue Allow Order 230 to signal to the MS 180 that if a failure occurs, that MS 180 is allowed to attempt to rescue the connection.

Figure 13B:
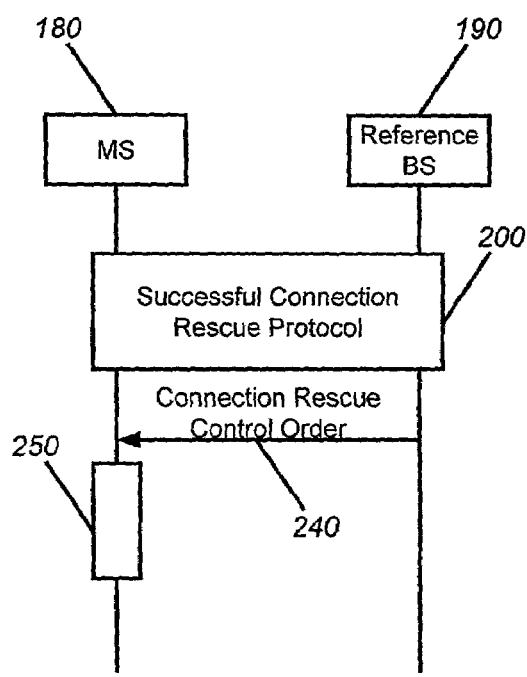

FIG. 13B illustrates an alternate embodiment where a Connection Rescue Control Order 240, which is sent to the MS 180 after the successful rescue procedure 200, informs the MS 180 of specific connection rescue limitations currently in effect. For example, the Connection Rescue Control Order 240 may specify that the MS 180 may not rescue again until a time period represented by block 250 expires.

Figure 13C:
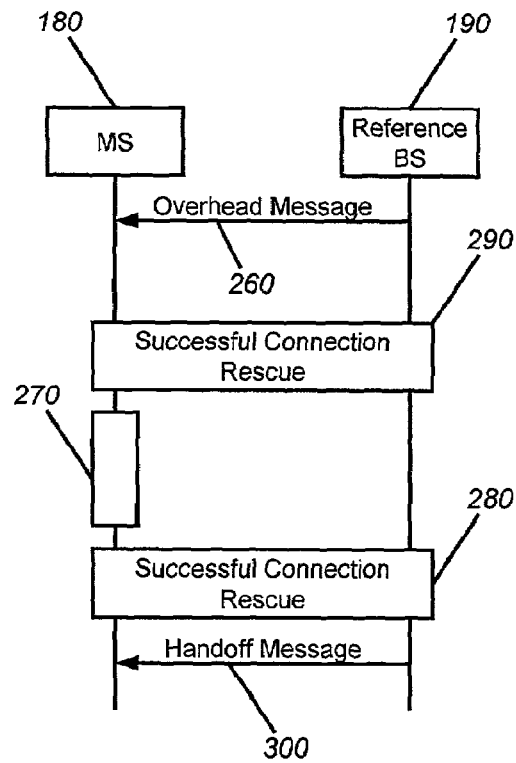

FIG. 13C shows how a reference BS 190 may communicate general rescue limitations in overhead messages 260 to MS 180. Examples of such overhead messages include paging channel system parameters messages or in-traffic system parameters messages. In addition to the different ways of controlling the rescue attempts, there are several ways of specifying the behavior of the method. Some examples of embodiments include specifying the number of rescues (per connection or per period of time or otherwise) to be fixed in the standard or implementation, specifying this information in overheads 260 (paging channel or other common channel messaging), specifying the information per connection (per MS), for example, at the start of a connection or at each handoff, or specifying the parameters at the time of, or just after, a successful rescue. In one embodiment, a limitation specified in the overhead message 260 may include a time between rescue attempts. FIG. 13C shows a time period 270 exceeding such a time limit and therefore permitting a second rescue 280 after the time 270 has passed since the first successful rescue 290. FIG. 13C also shows that a handoff message 300 may also include modified connection rescue limitation information and provide such parametric information in a timely manner.

Figure 13D:
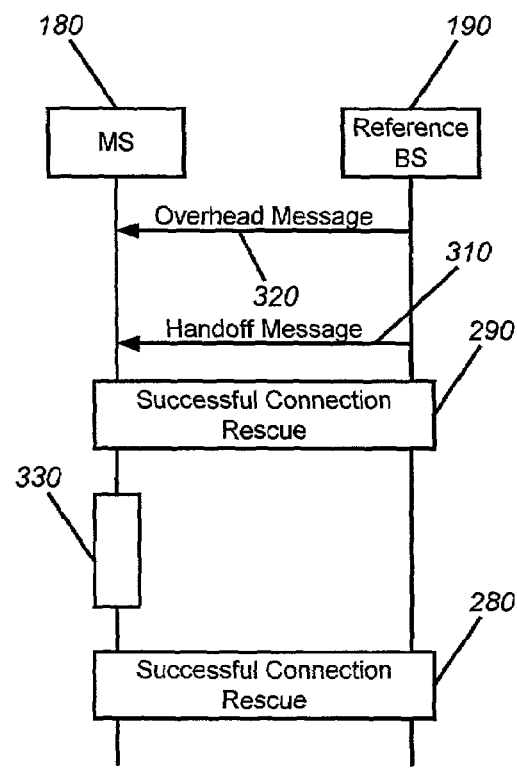

FIG. 13D shows how a handoff message 310 may update limitations previously specified in a overhead message 320 before any rescues occur. For example, the time limitation 330 may be changed.

Figure 13E:
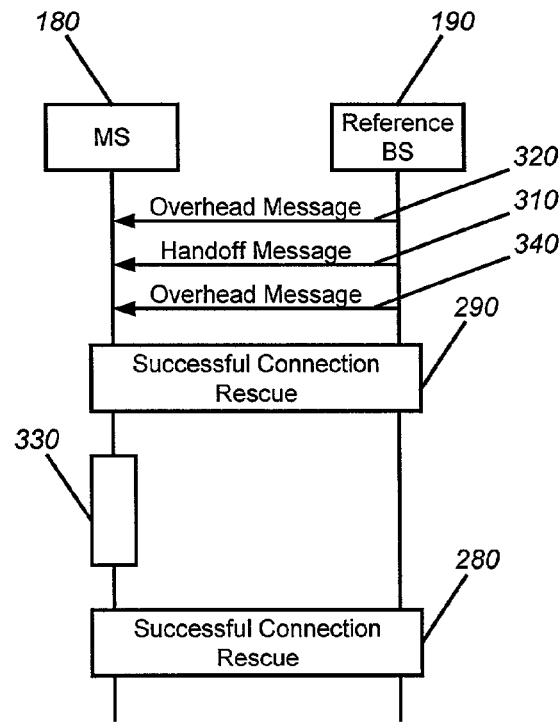

Similarly, FIG. 13E shows that after a handoff message 310 is received, a new overhead message 340 may update previously specified limitations before any rescues occur. Again, an example is shown where the time limitation 330 is changed.

Figure 13F:
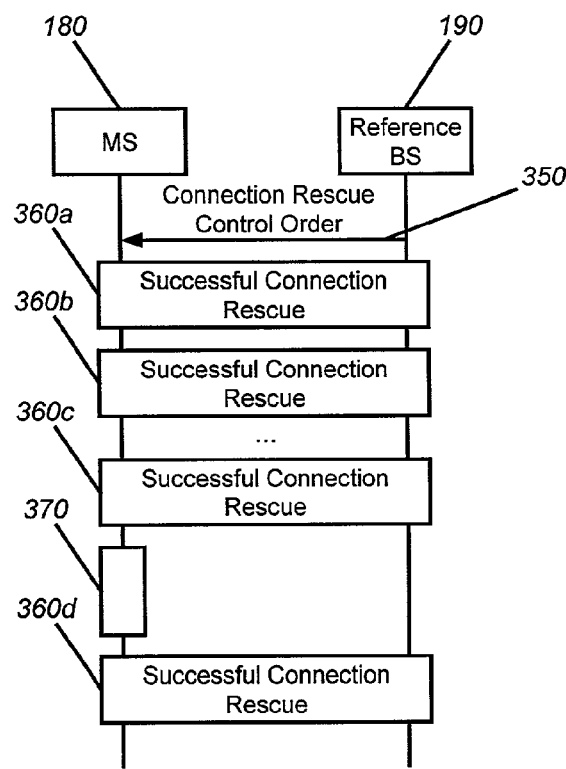

FIG. 13F shows an embodiment where a number of rescues are permitted in a period of time. This limitation is communicated in a Connection Rescue Control Order 350 in the embodiment of FIG. 13F. Note that although a number of connection rescues were completed at 360*a* through 360*c*, the MS could not initiate rescue 350*d* until an additional period of time 370 passed because too many rescues would have been performed in too short of a time period. It should be understood that, in FIGS. 13A–13F, if a failure occurs during any of the indicated time periods, the connection would be dropped.

Although the retry limit concepts described hereinabove used a CDMA cellular network as an example, the basic concept of establishing retry limits for rescues of connections in danger of being dropped are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for rescuing a connection between a network and a mobile station, wherein the mobile station has a potentially failing connection, the method comprising:
   identifying the potentially failing connection;
   allowing a rescue attempt for the potentially failing connection if a specified time period has elapsed since a last successful rescue of the connection; and
   receiving the specified time period from the network at the mobile station.

2. A method for rescuing a connection between a network and a mobile station, wherein the mobile station has a potentially failing connection, the method comprising:
   identifying the potentially failing connection;
   allowing a rescue attempt for the potentially failing connection if a specified time period has elapsed since a last successful rescue of the connection; and
   determining the specified time period at the network.

3. A method for rescuing a connection between a network and a mobile station, wherein the mobile station has a potentially failing connection, the method comprising:
   identifying the potentially failing connection;
   allowing a rescue attempt for the potentially failing connection if a specified time period has elapsed since a last successful rescue of the connection; and
   preventing the attempted rescue of the potentially failing connection so long as the specified time period has not elapsed since the last success rescue of the connection;
   wherein the specified time period is received from the network at the mobile station.

4. A method for rescuing a connection between a network and a mobile station, wherein the mobile station has a potentially failing connection, the method comprising:
   identifying the potentially failing connection;
   allowing a rescue attempt for the potentially failing connection if a specified time period has elapsed since a last successful rescue of the connection; and
   transmitting the specified time period to the mobile station from the network.

* * * * *